(12) United States Patent
Tajiri et al.

(10) Patent No.: US 7,012,920 B2
(45) Date of Patent: Mar. 14, 2006

(54) COMMUNICATION CONNECTING DEVICE CAPABLE OF REDUCING A LOAD ON AN IP NETWORK AND A DATA OUTPUT CONTROL METHOD

(75) Inventors: Katsutoshi Tajiri, Saitama (JP); Takashi Noda, Tokyo (JP); Rika Kamimura, Gunnma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 887 days.

(21) Appl. No.: 09/940,862

(22) Filed: Aug. 29, 2001

(65) Prior Publication Data

US 2002/0027926 A1 Mar. 7, 2002

(30) Foreign Application Priority Data

Aug. 31, 2000 (JP) ............................. 2000-262745

(51) Int. Cl.
*H04L 12/28* (2006.01)
*H04L 12/56* (2006.01)

(52) U.S. Cl. .................... 370/392; 370/389; 370/395.5

(58) Field of Classification Search ................ 370/429, 370/229, 401, 271, 285, 286, 287, 289, 493, 370/495, 428, 389, 474–476, 386, 395.7, 370/395.72, 497, 463, 465, 410, 68.1, 395.1, 370/396, 252, 392, 349, 374, 368, 290, 291, 370/232, 253, 352–356; 375/354, 355, 326; 358/403, 404, 405, 407, 434–439, 440, 442, 358/443, 444, 468, 470, 539, 426.07, 426.06, 358/426.16, 426.12, 426.13, 426.14; 368/426.11; 379/100.01, 100.17, 100.12, 100.09, 90.01; 348/423.1

See application file for complete search history.

(56) References Cited

U.S. PATENT DOCUMENTS 5,739,919 A * 4/1998 Lee et al. ................... 358/407
5,828,468 A * 10/1998 Lee et al. ................... 358/434

(Continued)

OTHER PUBLICATIONS

"Procedures for Real Time Group 3 Facsimile Communication Over IP Networks" ITU-T, T.38, International Telecommunication Union., Series T: Terminals for Telematic Services, Jun. 1998.

(Continued)

*Primary Examiner*—Wellington Chin
*Assistant Examiner*—Jamal A. Fox
(74) *Attorney, Agent, or Firm*—Venable LLP; Michael A. Sartori; Catherine M. Voorhees

(57) ABSTRACT

In an Internet facsimile apparatus, a facsimile controller temporarily stores data received from a G3 (Group 3) facsimile apparatus or the other terminal unit to communicate with. A packetizer/depacketizer packetizes the data sequentially read out in accordance with size information fed from a size information storage and feeds the resulting packets to a UDPTL controller and a buffer. The packetizer/depacketizer determines whether data received from the other terminal unit and decoded is a response to data sent from the G3 facsimile apparatus or retransmitted data, and delivers a response detection signal representative of the result of decision to the UDPTL controller. In the UDPTL controller, a filtering circuit deletes stored past data in accordance with the response detection signal representative of a response. The apparatus reduces a load on an IP (Internet Protocol) network.

8 Claims, 7 Drawing Sheets

U.S. PATENT DOCUMENTS

| | | | |
|---|---|---|---|
| 6,023,470 A * | 2/2000 | Lee et al. ................... | 370/401 |
| 6,263,396 B1 * | 7/2001 | Cottle et al. ................ | 710/263 |
| 6,369,855 B1 * | 4/2002 | Chauvel et al. .......... | 348/423.1 |
| 6,504,838 B1 * | 1/2003 | Kwan ......................... | 370/352 |
| 6,549,587 B1 * | 4/2003 | Li .............................. | 375/326 |
| 6,731,625 B1 * | 5/2004 | Eastep et al. ............... | 370/352 |
| 6,754,181 B1 * | 6/2004 | Elliott et al. ................ | 370/252 |
| 6,757,367 B1 * | 6/2004 | Nicol ..................... | 379/90.01 |
| 6,765,931 B1 * | 7/2004 | Rabenko et al. ........... | 370/493 |

OTHER PUBLICATIONS

"Procedures for Real-Time Group 3 Facsimile Communication Over IP-Networks," ITU-T Recommendation T.38, Jun. 1998, pp. 1-30.

Robert G. Tebbs, "Real Time IP Facsimile: Protocol and Gateway Requirements," Bell Labs Technical Journal, vol. 4, No. 2, Apr. 1999, pp. 128-145.

* cited by examiner

Fig. 4

| IFP PACKET | | UDPTL PACKET | | |
|---|---|---|---|---|
| No. | MEANING | PRIMARY | SECONDARY 1 | SECONDARY 2 |
| 01 | CED | 01 | X | X |
| 02 | FLAGS | 02 | 01 | X |
| 03 | CSI | 03 | 02 | 01 |
| 04 | CSI/FCS | 04 | 03 | 02 |
| 05 | DIS | 05 | 04 | 03 |
| 06 | DIS/FCS | 06 | 05 | 04 |
| 07 | FLAGS | 07 | X | X |
| 08 | TSI/FCS | 08 | 07 | X |
| 09 | DCS/FCS | 09 | 08 | 07 |
| 10 | TRAINING | 10 | 09 | 08 |
| 11 | FLAGS | 11 | 06(X) | 05(X) |
| 12 | CFR | 12 | 11 | 06(X) |
| 13 | CFR/FCS | 13 | 12 | 11 |
| 14 | SPEED | 14 | 10(X) | 9(X) |
| 15 | IMAGE DATA 0 | 15 | 14 | 10(X) |
| 16 | IMAGE DATA 1 | 16 | 15 | 14 |
| 17 | IMAGE DATA 2 | 17 | 16 | 15 |
| 18 | IMAGE DATA 3 | 18 | 17 | 16 |
| – | IMAGE DATA | – | – | – |
| 78 | IMAGE DATA 63 | 78 | 77 | 76 |
| 79 | IMAGE DATA 64 | 79 | 78 | 77 |
| 80 | IMAGE DATA 65 | 80 | 79 | 78 |
| 81 | SIG-END | 81 | 80 | 79 |
| 82 | FLAGS | 82 | 81 | 80 |
| 83 | EOP/FCS | 83 | 82 | 81 |
| 84 | FLAGS | 84 | 13(X) | 12(X) |
| 85 | MCF | 85 | 84 | 13(X) |
| 86 | MCF/FCS | 86 | 85 | 84 |

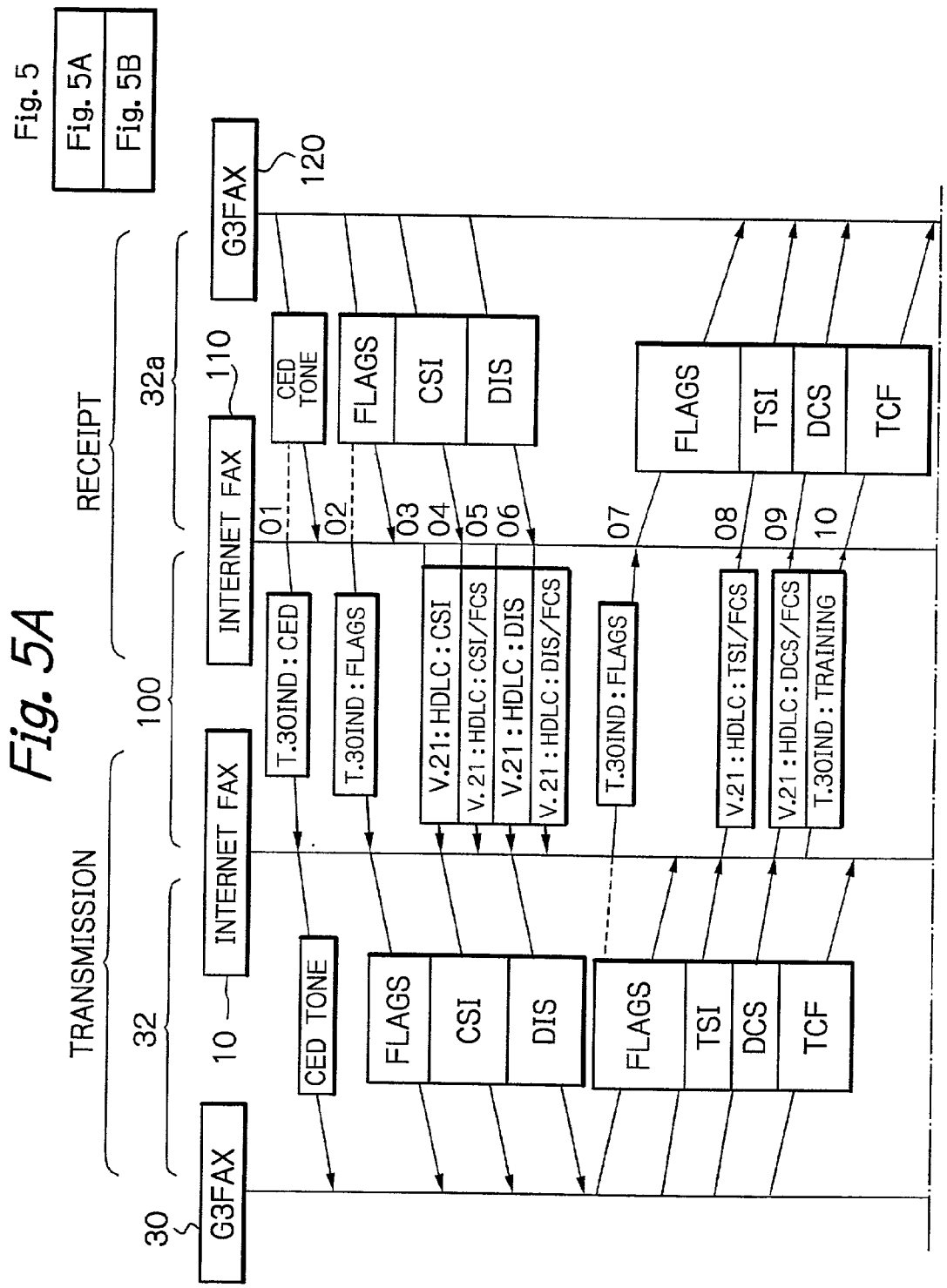

COMMUNICATION CONNECTING DEVICE CAPABLE OF REDUCING A LOAD ON AN IP NETWORK AND A DATA OUTPUT CONTROL METHOD

BACKGROUND OF THE INVENTION

Field of the Invention

The present invention relates to a communication connecting device and a data output control method advantageously applicable to, e.g., a gateway that connects a G3 (Group 3) facsimile apparatus or terminal to an IP (Internet Protocol) network. More particularly, the present invention relates to a communication connecting device and a data output control method feasible for a real-time facsimile apparatus for sending UDP (User Datagram Protocol)/IP packets while monitoring the data of the packets.

Generally, for real-time facsimile communication over an IP network, a system configuration proposed by ITU-T (International Telecommunication Union-Telecommunication standardization sector) Recommendation T.38 is used. In this system configuration, an Internet facsimile apparatus or gateway is connected to the IP network at each of the transmitter and receiver sides. The Internet facsimile apparatuses each are connected to a particular G3 facsimile apparatus by a PSTN (Public Switched Telephone Network).

The Internet facsimile apparatus at the transmitter side receives data from the sending G3 facsimile apparatus and temporarily stores the data. The facsimile apparatus then packets the data by referencing packet size information fed thereto. The resulting packets are referred to as IFP (Internet Facsimile Protocol) packets.

UDP is applied to communication between the Internet facsimile apparatuses. For example, a UDP header is added to the head of a UDP payload storing data. Even when UDP packet data is lost, UDP does not execute processing for reconstructing the packet data.

Specifically, the Internet facsimile apparatus at the transmitter side temporarily stores the IFP packets to be sent. The Internet facsimile apparatus then writes every new IFP packet in the primary field of its storage area to thereby generate a UDPTL (facsimile UDP Transport Layer protocol) payload and sends the UDPTL payload to the IP network. In addition, to prepare for the loss of the UDP packet data, the Internet facsimile apparatus writes the UDP packets sent in the past in the secondary field of the storage area to thereby form a UDPTL payload although the past UDP packets are redundant. Sequence numbers unique to the primary fields are attached to the primary fields. A UDPTL header is added to the head of the UDPTL payload to complete a UDPTL packet. The UDP payload is constituted by such a UDPTL packet. A UDP packet is made up of a UDP header and a UDP payload.

After an IP header has been added to the UDP packet, the UDP packet is sent to the IP network via a LAN (Local Area Network).

The Internet facsimile apparatus at the receiver side decomposes the received IP packets to the level of UDPTL packets. The Internet facsimile apparatus then classifies, among the IFP packets of the decomposed UDPTL packets, IFP packets to be used and then depacketizes the classified IFP packets by decoding them, thereby recovering the original data. The Internet facsimile apparatus temporarily stores the recovered data and then sends them to the receiving G3 facsimile apparatus.

The problem with the above conventional transmission scheme is that every UDPTL packet has a primary field and a secondary field without exception. In practice, not all UDPTL packets need a secondary field in consideration of the G3 facsimile transmission procedure. UDPTL packets with unnecessary secondary fields wastefully increase a load on the IP network. Moreover, such UDPTL packets wastefully occupy a transmission buffer included in the transmitting Internet facsimile apparatus, obstructing efficient transmission.

SUMMARY OF THE INVENTION

It is an object of the present invention to provide a communication connecting device and a data output control method capable of reducing a load on a data sending terminal unit and an IP network.

In accordance with the present invention, a communication connecting device is connected at one end to a first terminal unit and connected at the other end to a second terminal unit via an IP network. The device is selectively operable with a plurality of communication standards adaptive to the first terminal unit, second terminal unit and IP network for thereby implementing real-time communication. The device includes a terminal unit control circuit for storing data received from the first or the second terminal unit, and controlling the first terminal unit in accordance with a first communication standard. A first storage stores size information representative of the size of data to be coded. A coding/decoding circuit collectively codes the data in accordance with the size information read out of the first storage and the first communication standard. Also, the coding/decoding circuit decodes coded data received from the second terminal unit in accordance with the first communication standard and determines whether the decoded data is a response to data sent from the first terminal unit or retransmitted data. Assuming a loss of the coded data output from the coding/decoding circuit, a second storage stores the coded data. An information adding/separating circuit adds a header and data for making up for the loss of the coded data assumed to the coded data in accordance with a second communication standard relating to the IP network. At this instant, the information adding/separating circuit filters the data in response to a response detection signal output from the coding/decoding circuit and representative of the response. Further, the information adding/separating circuit separates coded data from data received from the second terminal unit and feeds them to the coding/decoding circuit. An interfacing circuit converts the coded data input via the information adding/separating circuit to a signal based on a command or converts a signal received from the second terminal unit to the coded data.

Also, in accordance with the present invention, a data output control method for a communication connecting device of the type described begins with a step of storing data received from the first terminal unit or the second terminal unit. Size information representative of the size of data to be coded is output. The data are collectively coded in accordance with the read out size information and a first communication standard. The coded data is stored on the assumption of a loss of the same. Among data received from the second terminal unit, coded data is separated and then decoded. At this time, whether the decoded data is a response to data sent from the first terminal unit or retransmitted data is determined. A response detection signal is output in accordance with the result of the above decision. Subsequently, first filtering or second filtering is executed in accordance with the response detection signal. The first filtering reads out, in accordance with a second communication standard relating to the IP network, a header for the coded data and the coded data stored on the assumption of the loss and adds the header and coded data to newly input coded data. The second filtering deletes the coded data currently stored. Finally, the coded data is converted to a signal based on a command and then output.

BRIEF DESCRIPTION OF THE DRAWINGS

The objects and features of the present invention will become more apparent from consideration of the following detailed description taken in conjunction with the accompanying drawings in which:

FIG. 4 is a table showing a relation between IFP packets and the primary and secondary fields of UDPTL packets;

FIG. 5 shows how FIGS. 5A and 5B are combined;

FIGS. 5A and 5B demonstrate a specific conventional Internet facsimile communication sequence to be executed by the system of FIG. 3.

DESCRIPTION OF THE PREFERRED EMBODIMENT

Figure 1:
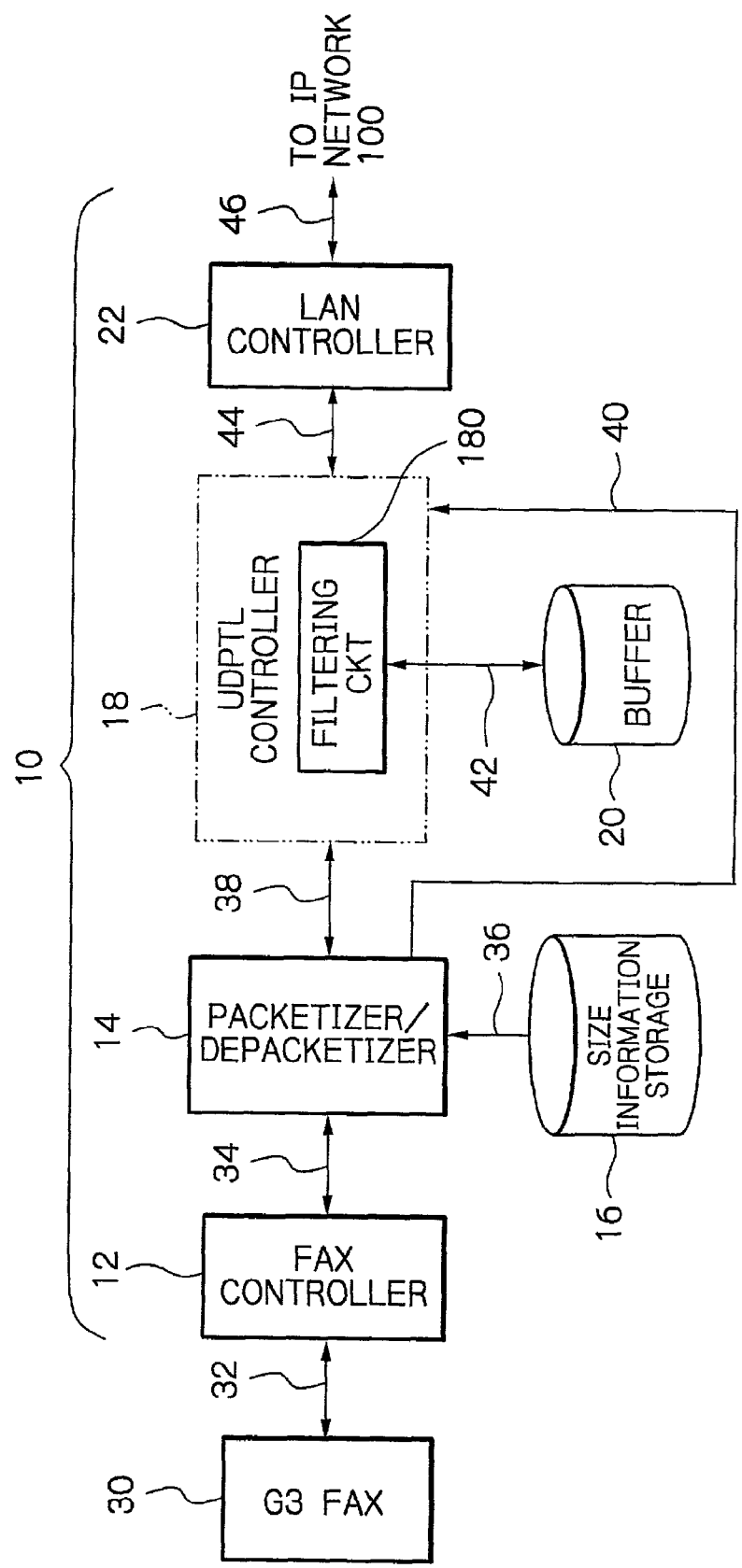
FIG. 1 is a schematic block diagram showing a preferred embodiment of the communication connecting device in accordance with the present invention and implemented as an Internet facsimile apparatus by way of example.

Referring to FIG. 1 of the drawings, an Internet facsimile apparatus or terminal (Internet FAX hereinafter) 10 to which a communication connecting device embodying the present invention is applied will be described. Part of the Internet FAX 10 not relevant to the understanding of the present invention is neither shown nor will be described specifically. Signals are designated by reference numerals attached to signal lines on which they appear.

As shown in FIG. 1, the Internet FAX 10 includes a FAX controller 12, a packetizer/depacketizer 14, a size information storage 16, a UDPTL controller 18, a buffer 20, and a LAN controller 22. An analog G3 facsimile apparatus (G3 FAX hereinafter) 30 is connected to the Internet FAX 10 and operates in accordance with Recommendation T.30 (revised in 1996).

The FAX controller 12 includes a non-destructive memory for storing data and has an interface function for converting signals meant for the G3 FAX 30, although not shown specifically. The non-destructive memory is capable of repeatedly outputting data 32 input from the G3 FAX 30. The FAX controller 12 selectively controls the write-in of the data 32 or the read-out of data 34 in accordance with a control signal fed from a system controller not shown. The data 34 read out of the memory are fed to the packetizer/depacketizer 14. When the Internet FAX 10 is a receiving terminal, the packetizer/depacketizer 14 depacketizes received data while the FAX controller 12 stores the resulting depaketized and decoded data 34.

The packetizer/depacketizer 14 includes a packetizing circuit and a depacketizing circuit although not shown specifically. The size information storage 16 stores information representative of the size of a single packet beforehand. The storage 16 feeds packet size information 36 to the packetizer/depacketizer 14. The packeting circuit divides the input data 34 into packets each having the packet size indicated by the information 16. The packetizing circuit then delivers coded IFP packets 38 to the buffer 20 and UDPTL controller 22. The depacketizing circuit decodes and depacketizes coded IFP packets 38 input from the UDPTL controller 18.

The packetizer/depacketizer 14 additionally includes a response decision circuit, not shown, for determining whether or not the input data 38 is a response to the coded data previously sent. If the answer of this decision is positive, the response decision circuit delivers a response detection signal 40 to the UDPTL controller 18.

The UDPTL controller 18 produces a UDPTL payload including the IFP packet data 38 in accordance with Recommendation T.38. The UDPTL payload consists of a primary field corresponding to a packet number and a secondary field storing an IFP packet or packets having been sent. More specifically, the past data stored in the buffer 20 are fed to the secondary field although redundant. If desired, an error correction code may be packed in the secondary field in addition to the past data. The IP packet data 38 are delivered also to the buffer 20 via the UDPTL controller 18 and a signal line 42.

The UDPTL controller 18 adds a UDPTL header to the head of the UDPTL payload to thereby complete a UDPTL packet, which is a UDP payload. The UDPTL controller 18 delivers the UDPTL packet 44 to the LAN controller 22.

In the event of receipt, a received UDPTL packet 44 having the above-described layered data structure is input to the UDPTL controller 18. The UDPTL controller 18 selectively decodes or omits the redundant part of the UDPTL packet (e.g. secondary field) and then delivers only the necessary IFP packet 38 to the packetizer/depacketizer 14.

The UDPTL controller 18 includes filtering circuitry 180. The filtering circuitry 180 selectively adds past coded data sent as a secondary field, inhibits the addition of the past coded data or omits the past coded data. The UDPTL controller 18 may precede or follow the generation of a UDPTL packet based on the UDPTL protocol, depending on the inhibiting function or the omitting function.

Figure 2:
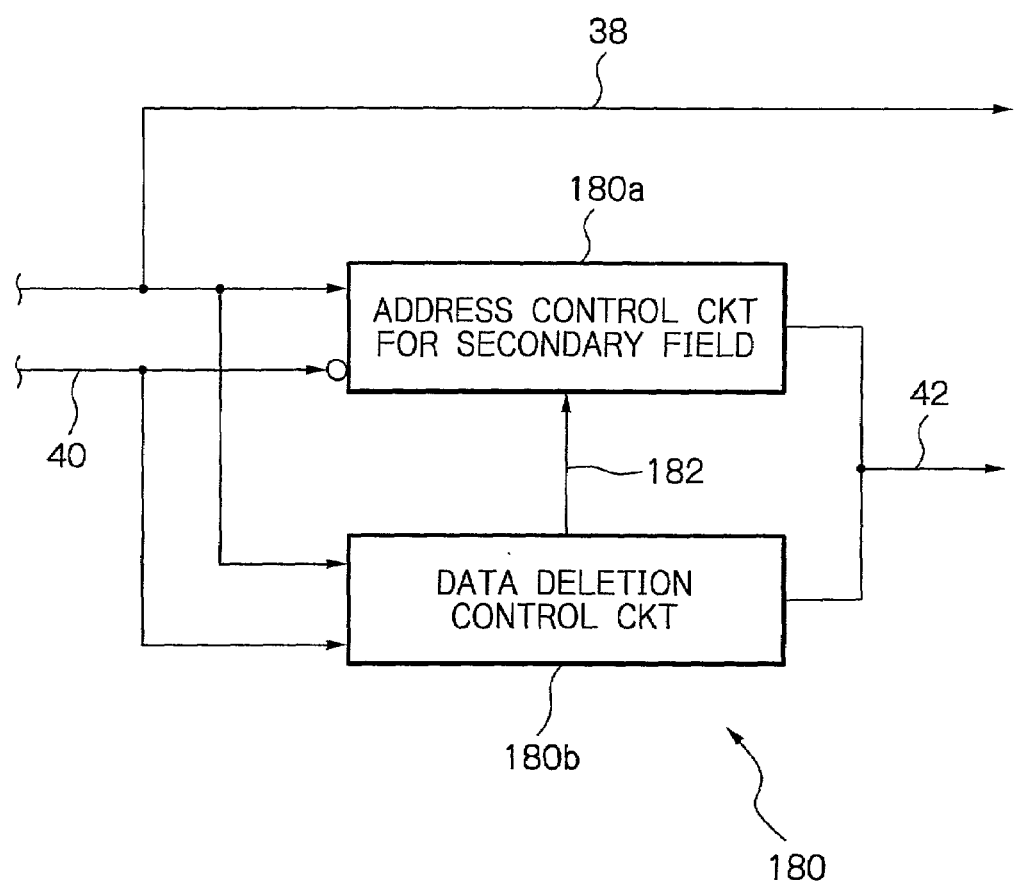
FIG. 2 is a schematic block diagram showing filtering circuitry included in a UDPTL controller, which is included in the illustrative embodiment.

Assume that the UDPTL controller 18 precedes the generation of a UDPTL packet. Then, as shown in FIG. 2, the UDPTL controller 18 includes an address control circuit 180a for the secondary field and a data deletion control circuit 180b. The address control circuit 180a receives the IFP packet data 38 and response detection signal 40. The response detection signal 40 enables the address control circuit 180a when in an active-low level. That is, the address control circuit 180a operates during usual transmission.

More specifically, the address control circuit 180a manages the addresses of the buffer 20 while controlling the operation of the buffer 20. The address control circuit 180a feeds, when enabled, a read enable signal and address data to the buffer 20 as a signal 42. The buffer 20 delivers data designated by the signal 42 to the UDPTL controller 18.

The response detection signal 40 enables the data deletion control circuit 180b when in an active-high level. More specifically, the signal 40 in an active-high level shows that data sent from the other terminal unit has been received. It follows that re-transmitting the same data despite the receipt of a response from the other terminal unit is wasteful. The data deletion control circuit 180b therefore delivers a deletion enable signal and deletion start address data to the buffer 20 as a signal 42. In response, the buffer 20 deletes stored IFP packet data meant for the secondary field. On the deletion of the IFP packet, the data deletion control circuit 180b feeds an address reset signal 182 to the address control circuit 180a for causing it to reset the address to a preselected value.

It is to be noted that the address control circuit 180a for the secondary field does not have to be included in the filter circuitry 180 because it usually operates.

Assume that the UDPTL controller 18 follows the generation of a UDPTL packet. Then, the filtering circuitry 180 deletes data or idle data regions that are older than the IFP packet data 38 currently input thereto, although not shown or described specifically. The filtering circuitry 180 may have the previously described function in addition to such a deleting function.

On the receipt of the response detection signal 40, the UDPTL controller 18 does not send any secondary field, but sends a UDPTL packet having only a primary field only one time. The UDPTL controller 18 performs this without regard to its position described above. Subsequently, the UDPTL controller 18 combines a primary field and a secondary field, which stores IFP packet data input after the detection of the response, to thereby output a UDPTL packet 44.

Referring again to FIG. 1, the LAN controller 22 adds a UDP header to the UDPTL packet or UDP payload 44 to thereby complete a UDP packet. Assume that data are interchanged by use of an IFP/UDPTL/UDP/IP layer model by way of example. Then, a UDP packet corresponds to an IP payload. In this case, the LAN controller 22 adds an IP header to an IP payload to thereby generate an IP packet. The LAN controller 22 transforms the IP packet 44 to an analog signal and sends the analog signal to the IP network 100 via a PSTN 50. The LAN controller 22 additionally has an interface function for matching the level of an electric signal to a protocol assigned to the IP network.

As stated above, on the receipt of a response from the other terminal unit, the Internet FAX 10 filters out, among UDPTL packet data, a secondary field otherwise wastefully storing data confirmed. The Internet FAX 10 therefore avoids wasteful transmission and thereby reduces a load on the IP network 100.

In the sending G3 FAX or terminal unit 30, a scanner, not shown, transforms data read out of a document to a corresponding electric signal and sends the electric signal in accordance with the G3 standard, which is proposed by Recommendation T.30. Specifically, the operator of the G3 FAX 30 lays documents, which are paper sheets or similar recording media, on a tray, not shown, which is mounted on the RT FAX 30. The operator then inputs a read command on an operation panel, not shown, also mounted on the G3 FAX 30. In response, the scanner starts scanning the documents with light. The scanner senses the intensity of reflection from part of each document where data is present and the intensity of reflection from the other part of the same and transforms each of them to a corresponding electric signal. An analog-to-digital converter, not shown, digitizes the electric signal and outputs the resulting digital signal or data 32 having tonality. The data 32 are sent to the FAX controller 12 via a PSTN 32.

Figure 3:
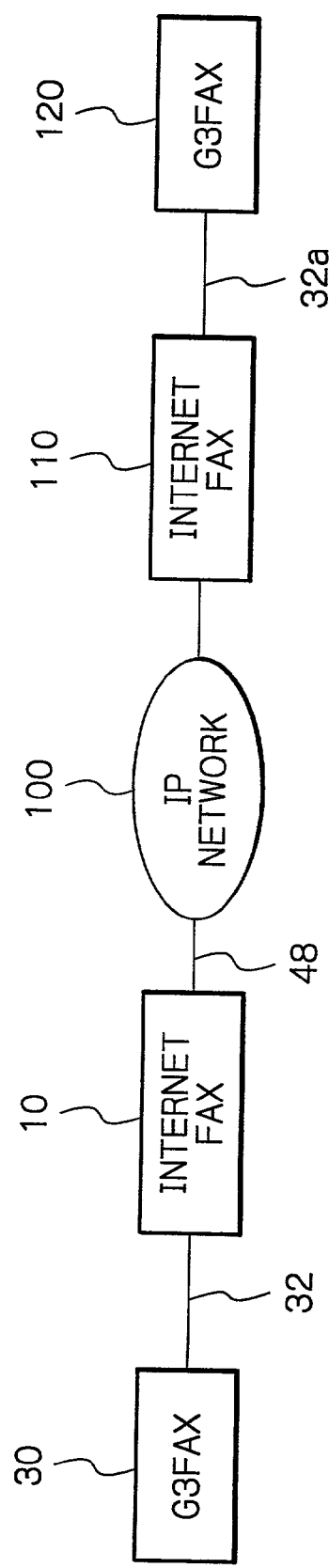
FIG. 3 is a schematic block diagram showing gateways connected to each other via an IP network and each being implemented by the Internet facsimile apparatus shown in FIG. 1.

As shown in FIG. 3, the real-time Internet FAX 10 is connected to another real-time Internet FAX 110 via an IP network 100. The Internet FAX 110 is connected to a G3 FAX 120 via a PSTN 32a. It will be seen that the Internet FAX 10, IP network 100 and Internet FAX 110 constitute a communication domain conforming to the Recommendation T. 38 protocol. The PSTN 32a between the Internet FAX 110 and the G3 FAX 120 conforms to the Recommendation T.30 protocol. The system shown in FIG. 3 terminals at the G3 FAX 30 and 120.

A real-time facsimile communication sequence generally executed by the system of FIG. 3 will be described hereinafter. The UDPTL controller 18, FIG. 1, writes every IFP packet in the primary field as new data while writing the past data sent in the secondary field in accordance with Recommendation T.38, thereby generating a UDPTL packet.

Specifically, a UDP payload generated by the UDPTL controller 18 includes a UDPTL header and a UDPTL payload, as stated earlier. FIG. 4 shows the data structure of a UDPTL payload. As shown, the UDPTL payload includes a primary and a secondary field, i.e., a plurality of IFP packets. In the illustrative embodiment, the secondary field is made up of a first and a second secondary field 1 and 2. The packetizer/depacketizer 14, FIG. 1, feeds the IFP packets to the buffer 20, FIG. 1, under the control of the system controller, as stated previously. The IFP packets are written to the primary fields of the buffer 20. The UDPTL controller 18 sequentially shifts the IFP packets read out of the buffer 20 from the secondary field 1 to the secondary field 2 in accordance with the number of times of transmission. Two or more IFP packets may be written to the secondary fields, if necessary.

In FIG. 4, stored data are designated by IFP packet numbers for easy identification. FIG. 4 shows a specific case wherein eighty-six IFP packets are dealt with. Crosses shown in FIG. 4 are representative of non-transmission.

Figure 5B:
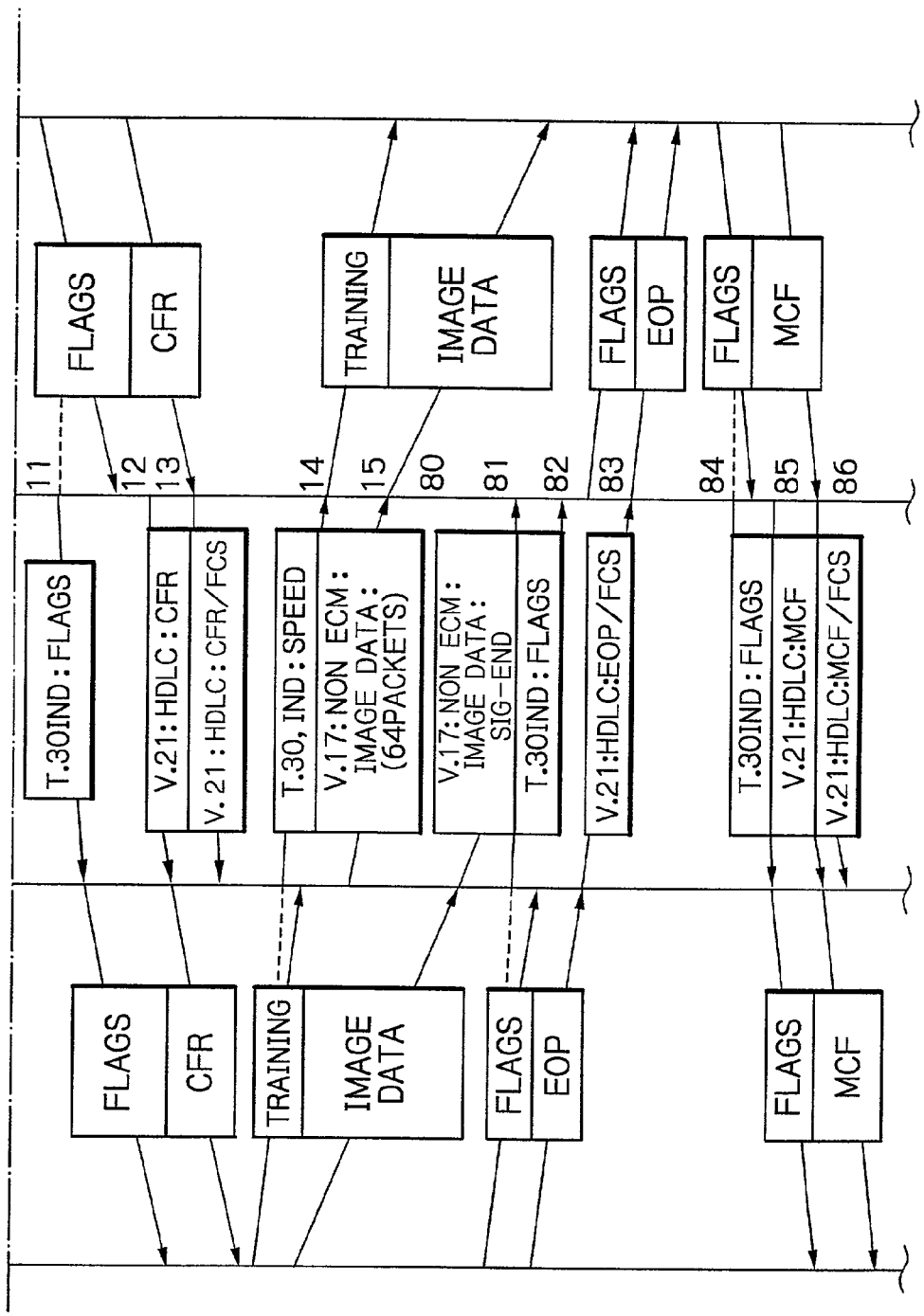

Reference will be made to FIGS. 5A and 5B for describing a real-time communication sequence effected with the eighty-six IFP packets shown in FIG. 4. Numbers 01 through 86 shown in FIGS. 5A and 5B are serial numbers attached to the IFP packets, but have nothing to do with sequence numbers in the UDPTL packets. Also, in FIGS. 5A and 5B, packets shown on the IP network 100 between the Internet FAXs 10 and 110 are representative of the primary fields of the UDPTL packets.

First, as shown in FIG. 5A, the receiving G3 FAX 120 sends four consecutive commands CED (CallEd station iDentification) tone, Flags, CSI (Called Station Identification) and DIS (Digital Identification Signal) to the Internet FAX 110. In response, IFP packets respectively corresponding to the received commands are input to the UDPTL controller of the Internet FAX 110. The UDPTL controller generates, based on Recommendation T.38, UDPTL packets each storing particular initial data (serial numbers 02 through 06; control data according to Recommendation T.30). The Internet FAX 110 packetizes the received UDPTL packets and sends the resulting IP packets to the Internet FAX 10 over the IP network 100.

The Internet FAX 10 separates the UDPTL packets and IFP packets from the UDP payloads of the received IP packets and decodes the separated packets, thereby reconstructing the four commands. The Internet FAX 10 then sends the four commands to the G3 FAX 30.

The transmitting G3 FAX 30 packets four commands Flags, TSI (Transmitting Station Identification), DCS (Digital Command Signal) and TCF (Training Check) corresponding to the received four commands. The G3 FAX 30 then sends the resulting UDPTL packets (IFP packets numbers 07 through 10) to the G3 FAX 120 via the Internet FAXs 10 and 110. At this instant, the Internet FAX 10 has already received a response to the data sent before the receipt of the above UDPTL packets. The Internet FAX 10 therefore generates the response detection signal 40 stated earlier.

Subsequently, as shown in FIG. 5B, the receiving G3 FAX 120 sends two commands Flags and CFR (ConFirmation to Receive) to the Internet FAX 110. The Internet FAX 110 packets the received commands into three packets (11 through 13) and sends them to the Internet FAX 10. The Internet FAX 110, however, considers that a continuous sequence of UDPTL packets sent from the Internet FAX 10 immediately before have been received. It is therefore wasteful to again send the past data designated by the serial numbers 05 and 06. In FIG. 4, parenthesized crosses indicate that the retransmission of the secondary fields are inhibited in the illustrative embodiment. On receiving the commands, the sending G3 FAX 30 sends a training command Training in order to control a modem included in the receiving G3 FAX 120, determining that communication has been set up.

Subsequently, the sending G3 FAX 30 sequentially sends stored image data and commands Flags and EOP (End Of Procedure) to the Internet FAX 10. Again, the Internet FAX 10 sends such data and commands on the assumption that a continuous sequence of data sent immediately before have been received. Consequently, as shown in FIG. 4, the secondary fields 1 and 2 of the serial number 14 are omitted. Also, the serial number 14 is attached to the secondary field 1 of the serial number 15 while the secondary field 2 is omitted. The Internet FAX 10 sends to the Internet FAX 110 IFP packets numbers 15 through 81 as image data and IFP packets numbers 82 and 83 as commands Flags and EOP/FCS (End Of Procedure/Frame Check Sequence). The Internet FAX 110 sends the received image data and reconstructed two commands Flags and EOP to the G3 FAX 120.

Finally, the receiving G3 FAX 120 sends commands Flags and MCF (Message ConFirmation) to the G3 FAX 30 via the Internet FAXs 110 and 10. This is the end of image data transfer. At this time, the secondary fields 1 and 2 of the serial number 84 and the secondary field 2 of the serial number 85 are omitted by filtering.

As stated above, the illustrative embodiment does not repeatedly send secondary fields sent immediately before and for which a response is meant. This is successful to effectively use the resources of the Internet FAXs 10 and 110.

Figure 6:
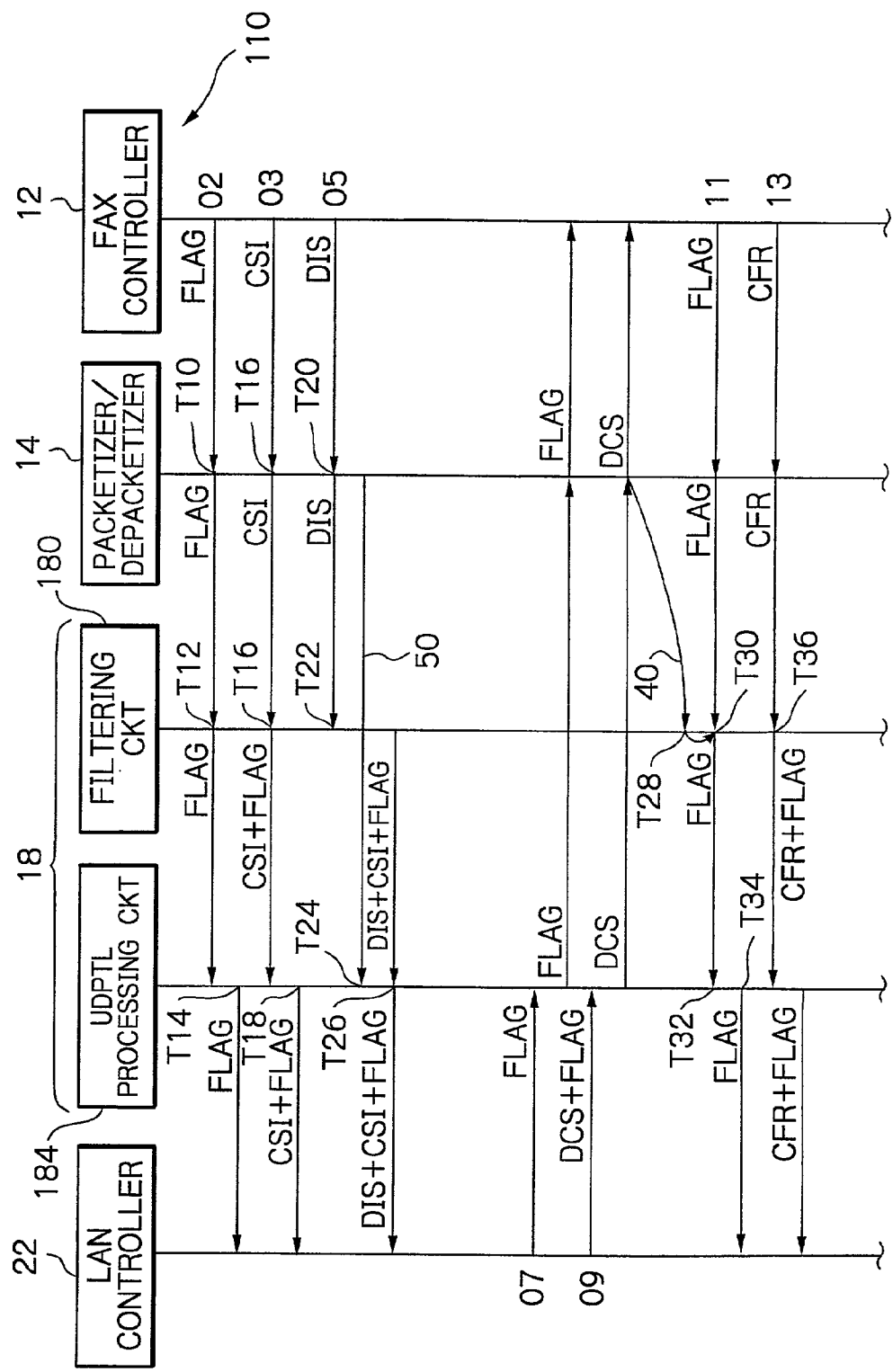
FIG. 6 shows an Internet facsimile communication sequence unique to the illustrative embodiment.

The real-time communication procedure will be described more specifically with reference to FIG. 6, paying attention to the operation sequence unique to the Internet facsimile apparatus. FIG. 6 demonstrates the transmission from the receiving Internet FAX 110 in order to clearly show the difference between the sequence of the illustrative embodiment and the general real-time communication sequence described with reference to FIGS. 5A and 5B. Because the structural elements of the Internet FAX 110 are identical with the structural elements of the Internet FAX 10, the former is designated by the same reference numerals as the latter.

First, the FAX controller 12 feeds a command Flag with a serial number 02 to the packetizer/depacketizer 14 (T10). The packetizer/depacketizer 14 packetizes the command Flag and then delivers it to the filtering circuitry 180 of the UDPTL controller 14 (T12). At the same time, the packetizer/depacketizer 14 determines whether or not the data is a response to data previously sent. If the answer of this decision is negative, the packetizer/depacketizer 14 delivers the detection signal 40 (low level) to the UDPTL controller 18, although not shown specifically.

At this stage of procedure, the buffer 20 stores no data to be written to secondary fields. The filter circuitry 180 therefore packs IFP packet data (Flag) input to a UDPTL processing circuitry 184 in the primary field of a UDPTL packet 44 while writing the same IFP packet data in the buffer 20. Consequently, the UDPTL packet 44 storing only the data Flag is fed from the UDPTL processing circuitry 184 to the LAN controller 22 (T14).

The UDPTL processing circuitry 184 combines the primary field (Flag) fed thereto and the IFP packet of the secondary field to thereby produce a UDPTL payload. The circuitry 184 then adds a UDPTL header to the UDPTL payload so as to produce a UDPTL packet (T14). The UDPTL packet is input to the LAN controller 22.

Subsequently, the FAX controller 12 feeds a CSI signal with a serial number 03 to the packetizer/depacketizer 14 (T16). The packetizer/depacketizer 14 packetizes the CSI signal and feeds the resulting CSI packet to the UDPTL controller 18. At this instant, the response detection signal 40 output from the packetizer/depacketizer 14 remains in a low level. The filter circuit 180 therefore reads out the data with the serial number 02 out of the buffer 20. In this manner, the data with the serial number 02 and the data CSI meant for a primary field are fed from the buffer 20 to the UDPTL processing circuitry 184. The UDPTL controller 18 packs the CSI IFP packet data in a primary field while writing it in the primary field of the buffer 20. At this time, the data Flag is shifted to the secondary field of the buffer 20.

The UDPTL controller 18 produces a UDPTL payload (CSI+Flag) by combining the CSI IFP packet and data Flag stored in the secondary field. The UDPTL controller 18 then adds a UDPTL header to the UDPTL payload to thereby complete a UDPTL packet (T18). The UDPTL packet is input to the LAN controller 22. The UDPTL controller 18 therefore again sends the UDPTL packet representative of the CSI signal and Flag.

Subsequently, the FAX controller 12 delivers a digital identification signal DIS with a serial number 05 to the packetizer/depacketizer 14 (T20). The packetizer/depacketizer 14 packetizes the DIS signal and feeds the resulting packet to the UDPTL controller 18, i.e., the filtering circuitry 180 (T22). At the same time, the packetizer/depacketizer 14 determines that the DIS signal is the last one of a continuous sequence of data fed thereto, and feeds a last-data detection signal 50 to the UDPTL processing circuitry 184 (T24). The UDPTL controller 18 packs the DIS IFP packet data in a primary field while writing it in the primary field of the buffer 20. At this instant, the shifted CSI signal and Flag data are present in the secondary field of the buffer 20.

The filtering circuitry 180 reads the CSI signal and Flag data meant for a secondary field out of the buffer 20 and delivers them to the UDPTL processing circuitry 184 together with the DIS IFP packet. The UDPTL processing circuitry 184 combines the input three data to thereby produce a UDPTL payload (T26). The circuitry 184 then adds a UDPTL packet to the UDPTL payload so as to produce a UDPTL packet (T26). The UDPTL packet is input to the LAN controller 22. If desired, the UDPTL controller 18 may be constructed to feed all the data of the secondary fields the same number of times on the basis of the last-data detection signal 50.

The Internet FAX 10 sends an IP packet to the Internet FAX 110 over the IP network 100. The Internet FAX 110 sequentially depacketizes the IP packet 100 into UDP packets, UDPTL packets 44 and IFP packets 38 in this order. The Internet FAX 110 then decodes the IFP packets 38 and delivers the resulting data 34 to the FAX controller 12. For example, on the receipt of a packet with a serial number 07 or 09, the UDPTL processing circuitry 184 separates only the primary field of the packet and feeds it to the packetizer/depacketizer 14.

In the Internet FAX 110, the packetizer/depacketizer 14 decodes the IFP packet data. At the same time, the previously mentioned response decision circuit included in the packetizer/depacketizer 14 determines whether or not the decoded data is a response to the data sent immediately before. If the answer of this decision is positive, the packetizer/depacketizer 14 causes the response detection signal 40 fed to the filter circuitry 180 to go high (T28). Further, the packetizer/depacketizer 14 feeds the decoded DCS data to the FAX controller 12.

In the illustrative embodiment, before the FAX controller 12 feeds data Flag with a serial number 11 to the UDPTL controller 18, the filter circuitry 180 deletes all the data stored in the primary and secondary fields of the buffer 20 in response to the response detection signal 40. That is, all the data stored in the buffer 20 for retransmission are cleared (T30).

The packetizer/depacketizer decodes and packs the data Flag with the serial number 11, thereby producing a Flag IFP packet. The Flag IFP packet is input to the UDPTL controller 18. Because the buffer 20 has been emptied, the Flag IFP packet is simply input to the UDPTL processing circuitry 184 (T32). Again, the circuitry 184 packs the data Flag in a primary field while writing it in the primary field of the buffer 20 (T34). Because the past data is absent in the buffer 20, the circuitry 184 produces a UDPTL packet not including a redundant secondary field.

Subsequently, the FAX controller 12 feeds data CFR with a serial number 13 to UDPTL controller 18 via the packetizer/depacketizer 14. In this case, the packetizer/depacketizer 14 packetizes the data CFR and the data Flag read out of the buffer 20. Therefore, the UDPTL processing circuit 184 produces a UDPTL packet (CFR+Flag) 44 storing CFR and Flag in its primary field and secondary field 1, respectively. The UDPTL packet 44 is input to the LAN controller 22.

While the secondary field has been shown and described as being made up of two secondary fields 1 and 2, it may included three or more secondary fields in order to further enhance the advantages of the present invention. If desired, the Internet FAXs 10 and 110 each may be provided with the function of a G3 facsimile apparatus.

As stated above, in the illustrative embodiment, a response detection signal is output when received data is determined to be a response to data sent during a sequence of real-time communication. The response detection signal causes all the data in the primary and secondary fields of the buffer 20 to be deleted, so that a minimum amount of UDPTL packets is sent. This promotes the efficient use of the limited capacity of a memory resource. Moreover, a load on the IP network 100 is reduced without degrading the reliability of data communication.

Of course, the present invention is not limited to an Internet facsimile apparatus for real-time facsimile communication, but can delete unnecessary data even with software.

In summary, it will be seen that the present invention provides a communication connecting device and a data output control method capable of promoting the efficient use of a memory resource and reducing a load on an IP network.

The entire disclosure of Japanese patent application No. 2000-262745 filed on Aug. 31, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication connecting device connected at one end to a first terminal unit and connected at the other end to a second terminal unit via an IP network, and selectively operable with a plurality of communication standards adaptive to said first terminal unit, said second terminal unit and said IP network for thereby implementing real-time communication, said device comprising:

a terminal unit control circuit for storing data received from the first terminal unit or the second terminal unit, and controlling said first terminal unit in accordance with a first communication standard;

a first storage storing size information representative of a size of data to be coded;

a coding/decoding circuit for collectively coding the data in accordance with the size information read out of said first storage and the first communication standard or decoding coded data received from the second terminal unit in accordance with said first communication standard and determining whether said coded data decoded is a response to data sent from the first terminal unit or retransmitted data;

a second storage for storing the coded data against a loss of the coded data output from said coding/decoding circuit;

an information adding/separating circuit for filtering, when adding a header and data for making up for the loss of the coded data to the coded data in accordance with a second communication standard that relates to the IP network, said data in response to a response detection signal output from said coding/decoding circuit and representative of the response or separating coded data from data received from the second terminal unit and feeding said coded data separated to said coding/decoding circuit; and an interfacing circuit for converting the coded data input via said information adding/separating circuit to a signal based on a command or converting a signal received from the second terminal unit to the coded data.

2. The device in accordance with claim 1, wherein said coding/decoding circuit comprises a response decision circuit for determining whether the coded data decoded is a response to the data sent or retransmitted data and outputting said response detection signal in accordance with a result of a decision.

3. The device in accordance with claim 1, wherein said information adding/separating circuit comprises a data deleting circuit for deleting, when said response detection signal is representative of the response, the coded data written to said second storage against the loss.

4. The device in accordance with claim 2, wherein said information adding/separating circuit comprises a data deleting circuit for deleting, when said response detection signal is representative of the response, the coded data written to said second storage against the loss.

5. The device in accordance with claim 4, wherein the first communication standard and the second communication standard respectively correspond to ITU-T Recommendation T.30 (revised in 1996) and Recommendation T.38 (June/1998), and wherein at least one of said first terminal unit and said second terminal unit comprises a G3 (Group 3) facsimile apparatus corresponding to Recommendation T.30 (revised in 1996).

6. A data output control method for a communication connecting device connected at one end to a first terminal unit and connected at the other end to a second terminal unit via an IP network, and selectively operable with a plurality of communication standards adaptive to said first terminal unit, said second terminal unit and said IP network for thereby implementing real-time communication, said method comprising:

a first step of storing data received from the first terminal unit or the second terminal unit;

a second step of outputting size information representative of a size of data to be coded;

a third step of collectively coding the data in accordance with the read out size information and a first communication standard;

a fourth step of storing the coded data against a loss of said coded data;

a fifth step of separating, among data received from the second terminal unit, coded data, decoding said coded data, determining whether said coded data decoded is a response to data sent from the first terminal unit or retransmitted data, and outputting a response detection signal in accordance with a result of a decision;

a sixth step of selectively executing, in accordance with said response detection signal, first filtering that reads out, in accordance with a second communication standard relating to the IP network, a header for the coded data and the coded data stored against the loss of said coded data and adds said header and said coded data to newly input coded data, or second filtering that deletes the coded data currently stored; and a seventh step of converting the coded data to a signal based on a command and outputting said signal.

7. The method in accordance with claim 6, wherein the sixth step comprises:

an eighth step of reading out the coded data stored and adding said coded data to newly input coded data;

a ninth step of executing said second filtering for deleting the coded data currently stored; and a tenth step of outputting a result of either one of said eighth step and said ninth step in accordance with said response detection signal.

8. The method in accordance with claim 7, wherein the first communication standard and the second communication standard respectively correspond to ITU-T Recommendation T.30 (revised in 1996) and Recommendation T.38 (June/1998), and wherein at least one of said first terminal unit and said second terminal unit comprises a G3 facsimile apparatuses corresponding to Recommendation T.30 (revised in 1996).

* * * * *